(12) United States Patent
Matsumoto

(10) Patent No.: US 7,005,972 B2
(45) Date of Patent: Feb. 28, 2006

(54) PORTABLE TRANSMITTER FOR REMOTELY CONTROLLING VEHICULAR DEVICES

(75) Inventor: Munenori Matsumoto, Kariya (JP)

(73) Assignee: Denso Corporation, Kariya (JP)

( * ) Notice: Subject to any disclaimer, the term of this patent is extended or adjusted under 35 U.S.C. 154(b) by 113 days.

(21) Appl. No.: 10/814,511

(22) Filed: Apr. 1, 2004

(65) Prior Publication Data

US 2004/0201492 A1 Oct. 14, 2004

(30) Foreign Application Priority Data

Apr. 3, 2003 (JP) ............................. 2003-100589

(51) Int. Cl.
*B60R 25/10* (2006.01)
(52) U.S. Cl. ..................... 340/426.28; 340/426.13; 340/5.6; 340/825.22; 340/825.76; 70/237; 70/239; 341/176
(58) Field of Classification Search ........... 340/426.28, 340/426.13, 426.14, 426.17, 5.6, 5.72, 10.3, 340/10.41, 825.22, 825.72, 825.76, 278.2; 70/237, 239, 278.1; 341/176
See application file for complete search history.

(56) References Cited

U.S. PATENT DOCUMENTS

| | | | |
|---|---|---|---|
| 5,831,514 A * | 11/1998 | Hilpert et al. | 340/309.8 |
| 6,331,812 B1 * | 12/2001 | Dawalibi | 340/5.2 |
| 6,380,842 B1 * | 4/2002 | Mattes et al. | 340/5.25 |
| 6,567,012 B1 | 5/2003 | Matsubara et al. | |
| 6,822,553 B1 * | 11/2004 | Henderson et al. | 340/5.73 |

FOREIGN PATENT DOCUMENTS

EP 1 198 069 A1 7/2001

* cited by examiner

*Primary Examiner*—Davetta W. Goins
(74) *Attorney, Agent, or Firm*—Posz Law Group, PLC

(57) ABSTRACT

When the connection of a cable to a control interface is confirmed, and thereafter a write command is received, a data write process is executed to renew contents of a conversion table stored in a memory based on link data attached to the write command. Furthermore, when a read command is received, a data read process is executed to retrieve the contents of the conversion table stored in the memory and thereafter to transmit the retrieved data to an external device through the control interface. Then, when disconnection of the cable is detected, the processes, each of which is executed according to the corresponding command transmitted from the external device, are bypassed.

6 Claims, 4 Drawing Sheets

FIG. 1
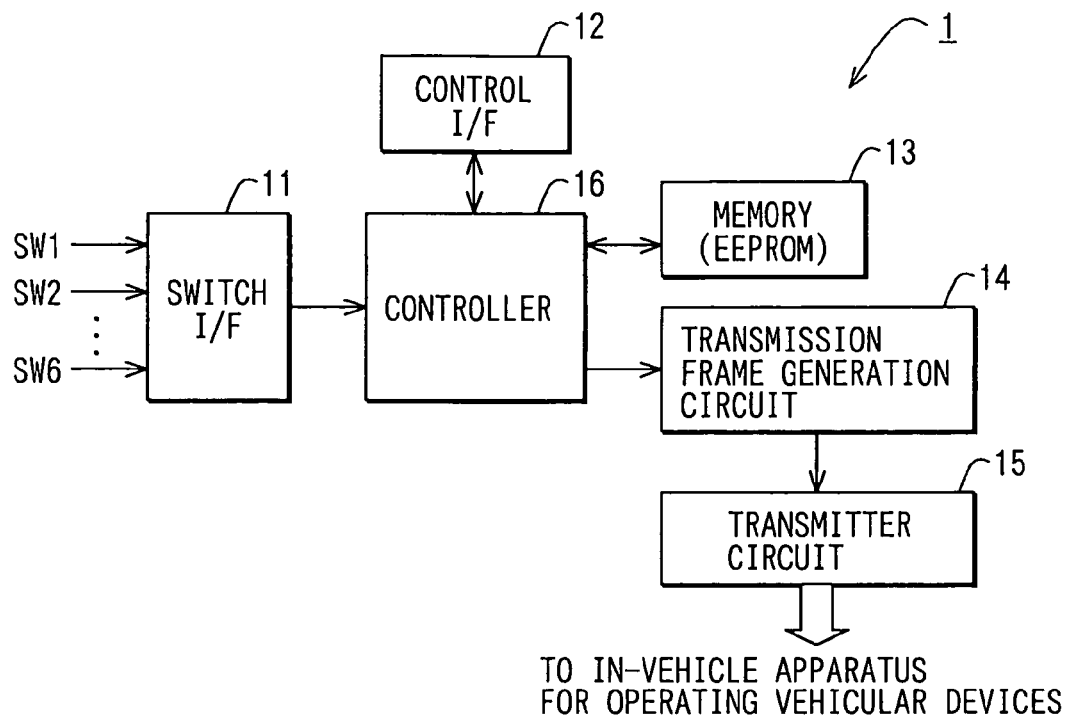
FIG. 2A
| BUTTON NO. | FUNCTION ID | BUTTON NO. | FUNCTION ID |
|---|---|---|---|
| SW1 | FUN4 | SW4 | FUN1 |
| SW2 | FUN5 | SW5 | FUN2 |
| SW3 | FUN6 | SW6 | FUN3 |
CONVERSION TABLE (IN MEMORY)
FIG. 2B
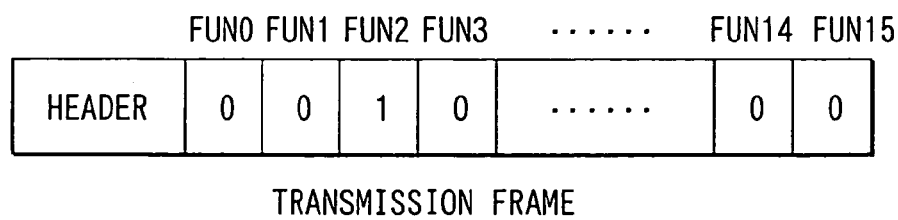
TRANSMISSION FRAME

PORTABLE TRANSMITTER FOR REMOTELY CONTROLLING VEHICULAR DEVICES

CROSS REFERENCE TO RELATED APPLICATION

This application is based on and incorporates herein by reference Japanese Patent Application No. 2003-100589 filed on Apr. 3, 2003.

BACKGROUND OF THE INVENTION

1. Field of the Invention

The present invention relates to a portable transmitter, which is used to remotely control each corresponding vehicular device of a vehicle.

2. Description of Related Art

A keyless entry system has been known. In the known keyless entry system, locking/unlocking of a door or a rear hatch of a vehicle can be remotely controlled in response to operation of a button of a door lock transmitter (portable transmitter), which is carried by a user, such as a driver.

More specifically, in the keyless entry system, the door lock transmitter, which is operated by the user through operation of the button, performs radio transmission of a corresponding operation command (e.g., a command for locking or unlocking of the door). The operation command commands a corresponding vehicular device to provide the function that corresponds to the operated button. An in-vehicle apparatus, which receives the operation command, drives the corresponding vehicular device (e.g., a door lock actuator) to provide the specified function, which is specified by the operation command.

The function, which is provided through the operation of the button of the door lock transmitter, is not limited to the above locking/unlocking of the door, and there are other functions, which include opening/closing of a slide door, a power window, a sunroof and/or the like. To provide these functions, the door lock transmitter also includes other buttons.

The above structure of the door lock transmitter is generally known and is regarded as a previously known or previously used prior art in the field of the keyless entry system, so that no prior art document with respect to the above structure is recited herein.

Frequently used functions and easily operable button positions vary from user to user. The frequently used functions are not always allocated to buttons located in easily operable positions. In order to improve convenience of individual user, it is desirable to meet a demand for customizing allocation of the functions to the buttons when such a demand exists.

To meet such a demand, for example, it is conceivable to prepare various door lock transmitters, each of which has a different allocation pattern for allocating functions to buttons, and to provide one of the door lock transmitters, which has the allocation pattern that meets the user's need. Alternatively, it is also conceivable to perform reconstruction, such as change of a wiring of a print circuit board of the door lock transmitter based on the user's need. However, in the former case, a relatively large amount of work is required in designing and manufacturing of the door lock transmitters. Also, in the latter case, additional work is required upon the manufacturing of the door lock transmitter. Thus, in both of the above cases, manufacturing costs are disadvantageously increased.

Particularly, in the case of changing a pattern of the wiring, it is highly possible to cause a change in radio characteristics. Thus, even when such reconstruction is made, the door transmitter cannot be used properly in some cases.

Furthermore, even when such reconstruction is made, it is only possible to change the allocation pattern for allocating the preselected functions to the buttons, and it is not possible to select desired functions among various functions, which are controllable from the door lock transmitter.

SUMMARY OF THE INVENTION

The present invention addresses the above disadvantages. Thus, it is an objective of the present invention to provide a portable transmitter, which allows easy customization of an allocation pattern for allocating available functions to switches (buttons) and also allows easy customization of the available functions.

To achieve the objective of the present invention, there is provided a portable transmitter for remotely operating a plurality of vehicular devices, each of which provides a corresponding one of a plurality of functions. The portable transmitter includes a plurality of switches, an operation command generating means, a transmitting means, a storage means, an interface means and a write control means. Each switch is linked with a corresponding one of the functions. The operation command generating means is for generating an operation command that causes a corresponding one of the vehicular devices to provide a selected one of the functions, which is selected upon operation of a corresponding one of the switches. The transmitting means is for performing wireless transmission of the operation command upon reception of the operation command from the operation command generating means. The storage means is for storing link data, which includes a plurality of links. Each link connects between a corresponding one the switches and a corresponding one of the functions. The interface means is for receiving an external command outputted from an external device. The write control means is for writing the link data in the storage means based on the external command received through the interface means. The operation command generating means generates the operation command based on the link data stored in the storage means.

BRIEF DESCRIPTION OF THE DRAWINGS

The invention, together with additional objectives, features and advantages thereof, will be best understood from the following description, the appended claims and the accompanying drawings in which:

FIG. 1 is a block diagram showing an outlined structure of a door lock transmitter of an embodiment used in a keyless entry system;

FIG. 2A is an explanatory diagram showing a structure of a conversion table stored in a memory of the door lock transmitter;

FIG. 2B is an explanatory diagram showing a structure of a transmission frame generated by a transmission frame generation circuit of the door lock transmitter;

DETAILED DESCRIPTION OF THE INVENTION

Figure 3:
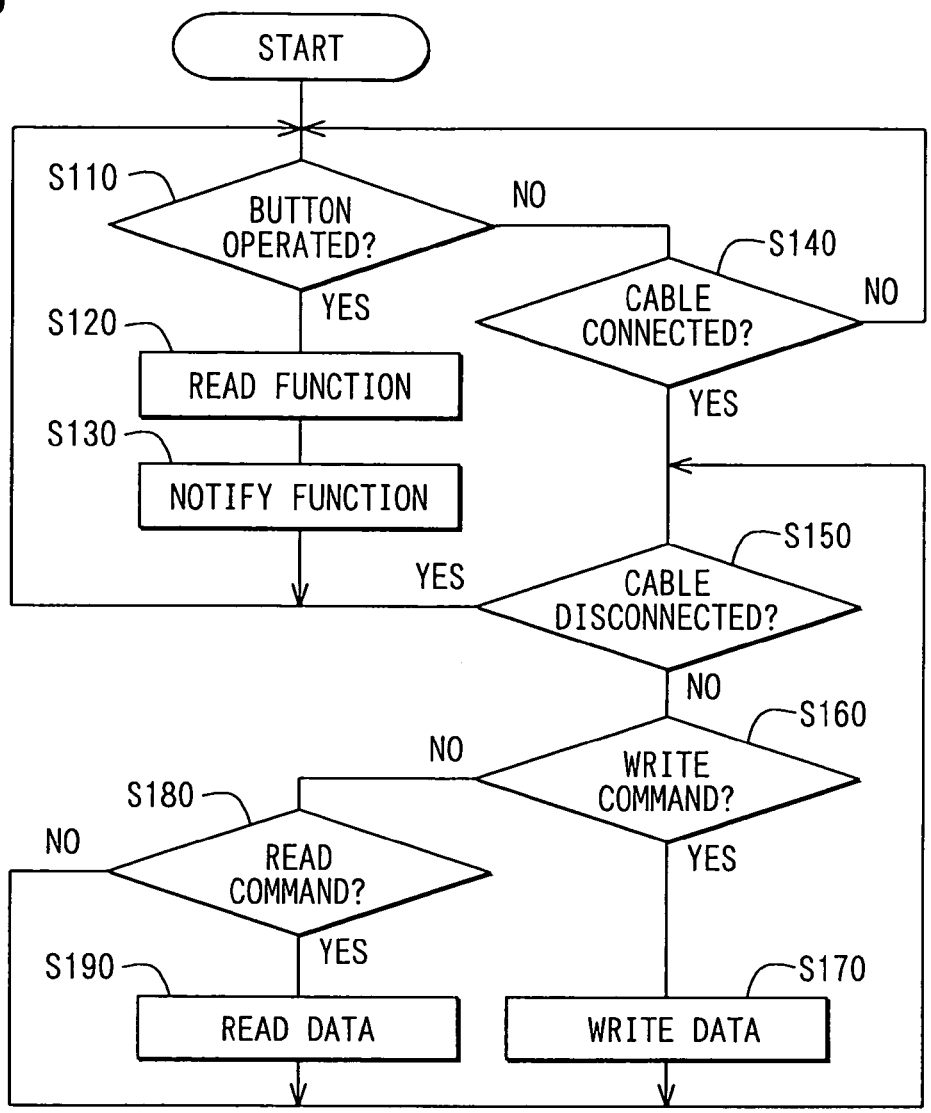
FIG. 3 is a flowchart showing a process executed by a controller of the door lock transmitter.

An embodiment of the present invention will be described with reference to the accompanying drawings.

FIG. 1 is a block diagram, which indicates an outlined structure of a door lock transmitter for a keyless entry system of a vehicle.

As shown in FIG. 1, the door lock transmitter 1 of the present embodiment includes six depressable button switches (hereinafter simply referred to as "buttons") SW1–SW6, a switch interface 11, a control interface 12, a memory 13, a transmission frame generation circuit 14, a transmitter circuit 15 and a controller 16. The buttons SW1–SW6 are used to select available functions, each of which is provided or performed upon remote control of a corresponding vehicular device of the vehicle. The switch interface 11 detects whether operation of the buttons SW1–SW6 is made. The control interface 12 is connected with a cable that is used to communicate with an external device, such as a personal computer. The memory 13 is an EEPROM and stores a conversion table, which includes link data that shows a link between each button SW1–SW6 and the corresponding available function. The transmission frame generation circuit 14 generates a transmission frame, which stores information of operation commands. The operation commands indicate the available functions, respectively. The transmitter circuit 15 performs radio transmission of the transmission frame, which is generated by the transmission frame generation circuit 14, to an in-vehicle apparatus installed in the vehicle. The controller 16 includes a known microcomputer as its main component and controls each above component of the door lock transmitter 1.

The control interface 12 includes a sensor (not shown), which detects connection/disconnection of the cable to the control interface 12.

The link data includes button numbers of the buttons SW1–SW6 and corresponding function IDs. Each function ID identifies the corresponding function, which is provided upon operation of the corresponding button SW1–SW6. With reference to FIG. 2A, the conversion table, which is generated based on the link data, is constructed to allow look-up of the function IDs, which respectively specify the functions allocated to the buttons. In the look-up operation of the function IDs, the button number, which is detected by the switch interface 11, is used as an index. The number (sixteen in this embodiment) of the function IDs is greater than the number (six in this embodiment) of the buttons.

With reference to FIG. 2B, the transmission frame, which is generated by the transmission frame generation circuit 14, includes a header section and a data section. The header section at least includes identification information. The identification information includes identification code, which is specific to the subject door lock transmitter 1. The data section includes a 16 bit flag area, and each of the 16 bits corresponds to the corresponding function ID (FUN0 to FUN15).

When the transmission frame generation circuit 14 receives a notification of the function ID from the controller 16, the transmission frame generation circuit 14 generates a corresponding transmission frame, which includes the flag area that has the corresponding bits, which correspond to the notified function IDs. Then, the transmission frame generation circuit 14 transmits the generated transmission frame through the transmitter circuit 15 by radio transmission.

An electronic control device of the in-vehicle apparatus of the vehicle, which receives the transmission frame, executes a corresponding control operation or process, which performs the specified function that is specified by the state of the flag area, only when the identification information contained in the header section of the transmission frame coincides with previously registered identification information.

Next, the process executed by the controller 16 will be described with reference to a flowchart of FIG. 3.

When the process is initiated, it is determined whether operation of any button is detected by the switch interface 11 at S110. Also, it is determined whether the connection or installation of the cable to the control interface 12 is detected at S140. Control waits until the operation of any button or the connection of the cable to the control interface 12 is detected.

Then, when the operation of any button is detected at S110, the function ID, which is allocated to the operated button, is specified according to the button number of the operated button based on the conversion table stored in the memory 13 at S120. Then, the specified function ID is notified to the transmission frame generation circuit 14 at S130, and thereafter control returns to S110. For example, when operation of the button SW3 is detected, the function ID, which indicates the FUN6, is notified to the transmission frame generation circuit 14 (FIG. 2A).

Thus, the corresponding transmission frame, which indicates the function ID that corresponds to the operated button, is generated by the transmission frame generation circuit. Thereafter, the generated transmission frame is transmitted to the electronic control device of the vehicle through the transmitter circuit 15 by radio transmission.

In contrast, when the connection of the cable to the control interface 12 is detected at S140, it is determined whether disconnection of the cable from the control interface 12 is detected at S150. Then, it is also determined whether a write command is received from the external device through the control interface 12 (i.e., through the connected cable) at S160. Furthermore, it is determined whether a read command is received at S180. The above steps S150–S180 are repeated until YES is returned at any of steps S150–S180.

When it is determined that the write command is received at S160, a data write process, which renews the contents of the conversion table stored in the memory 13, is executed based on the link data attached to the write command at S170, and then control returns to S150.

When it is determined that the read command is received at S180, a data read process is executed at S190, and control returns to S150. In the data read process, the contents of the conversion table stored in the memory 13 are read or retrieved, and the retrieved data is transmitted to the external device through the control interface 12.

When the disconnection of the cable is detected at S150, control bypasses the processes (S150–S190), each of which is executed according to the corresponding command transmitted from the external device, and control returns to S110.

Thus, the door lock transmitter 1 is constructed to allow the read/write (renewal) of the contents of the conversion table, which are stored in the memory 13 of the door lock transmitter 1, through the control interface 12.

Figure 4:
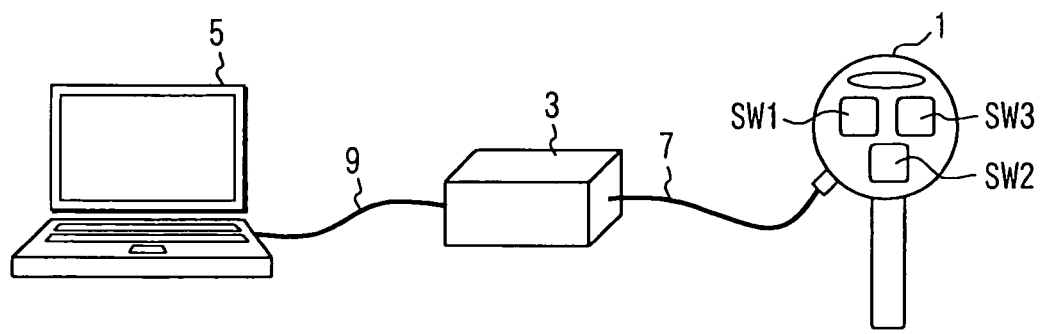
FIG. 4 is an explanatory diagram showing an outlined structure of a rewrite system, which renews the conversion table of the door lock transmitter.

FIG. 4 is an explanatory diagram, which schematically shows an outline of the door lock transmitter 1 and also shows an outlined structure of a rewrite system, which is used to read or renew the contents of the conversion table.

More specifically, the rewrite system includes the door lock transmitter 1 of the present embodiment, a personal computer (PC) 5 and a bench 3. For example, the PC 5 is used to input the write/read commands for the door lock transmitter 1 and is also used to display the data retrieved upon input of the read command. The bench 3 converts signals from one format to another format between a specialized interface of the door lock transmitter 1 and a universal interface of the PC 5. The door lock transmitter 1 and the bench 3 are interconnected by a cable 7, and the bench 3 and the PC 5 are interconnected by a cable 9.

Only the three buttons SW1–SW 3 are indicated in the door lock transmitter 1 shown in FIG. 4, and the other buttons SW4–SW6 are omitted for ease of understanding but actually exist in the door lock transmitter 1 (the same thing is true in FIG. 6).

A process executed by the PC 5, which serves as a controller of the rewrite system, will be described with reference to a flowchart shown in FIG. 5.

The PC 5 includes input devices (e.g., a keyboard and a mouse) and a display device (e.g., a cathode-ray tube display or LCD display). The present process is executed when a predetermined command is inputted through the input device upon completion of the wiring shown in FIG. 4.

Figure 5:
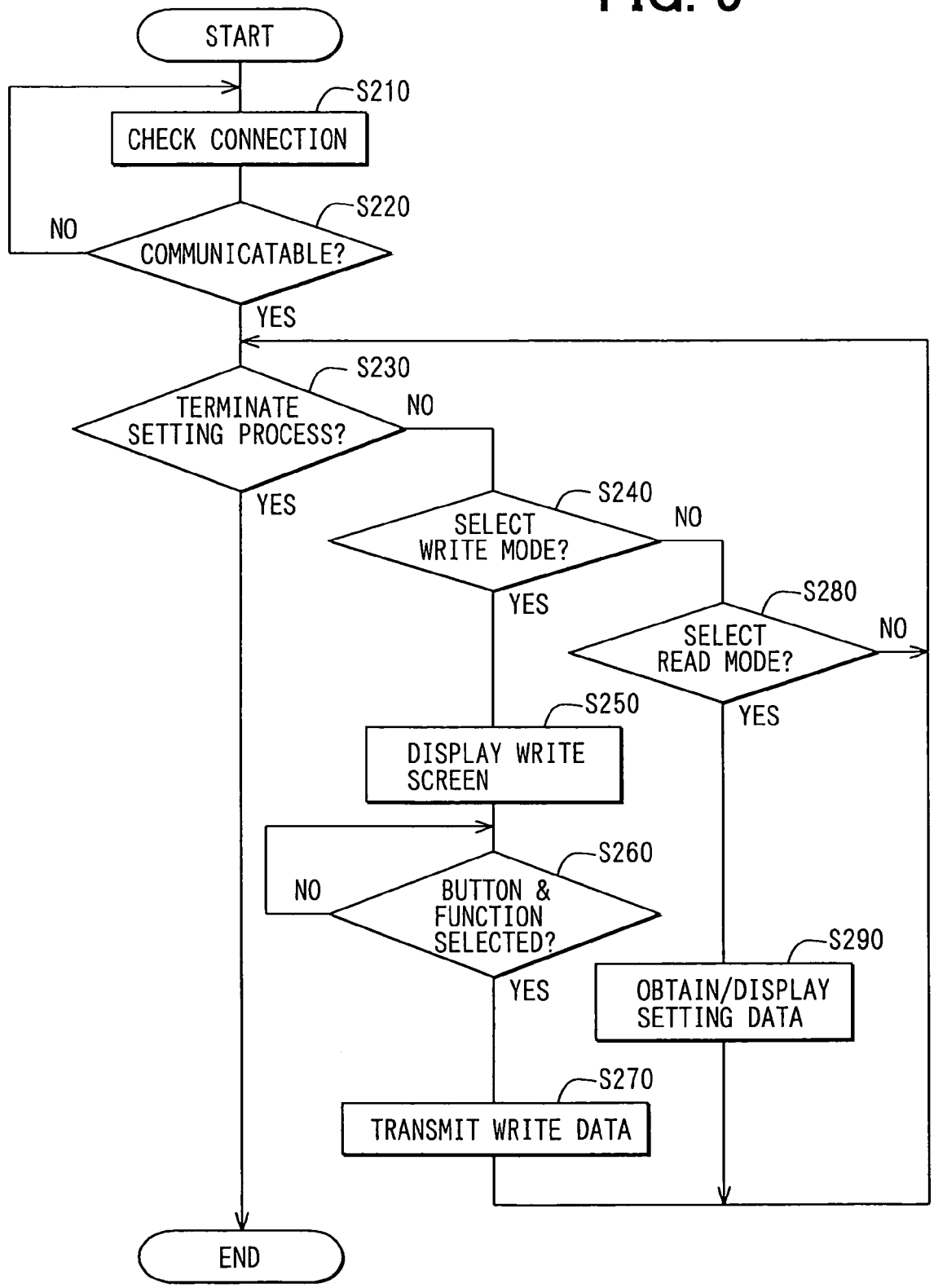
FIG. 5 is a flowchart showing a process executed by a personal computer of the rewrite system.

With reference to FIG. 5, when the present process is executed, a connection check process is executed to determine whether the PC 5 is in a communicatable state with the door lock transmitter 1 at S210. Based on a result of the connection check process, it is determined whether the communicatable state of the PC 5 is confirmed at S220. When the communicatable state of the PC 5 is not confirmed, control returns to S210 and waits until the communicatable state of the PC 5 is confirmed. At this time, the display device of the PC 5 can display a message that promotes the user to check the connection state.

In contrast, when the communicatable state of the PC 5 with the door lock transmitter 1 is confirmed, it is determined whether an input, which instructs termination of a setting process, is received through the input device at S230. Also, it is determined whether an input, which selects a write mode, is received at S240. Furthermore, it is determined whether an input, which selects a read mode, is received at S280. When none of the inputs is received at S230–S280, control returns to S230 and waits until any one of the above inputs is received.

When it is determined that the input, which selects the write mode, is received at S240, a write screen is displayed on the display device at S250. The write screen allows selection of the desired button, for which the desired function ID will be written, and also allows selection of the corresponding function, which will be allocated to the selected button. Then, control waits for the selection of the button and the selection of the function on the write screen at S260. Thereafter, when the selection of the button and the selection of the function are completed, a write command, to which write data (link data) is attached, is transmitted to the door lock transmitter 1 through the interface (S270), on which the connection check is performed at S210, and control returns to S230. The write data (link data) includes a combination of the button number of the selected button and the function ID of the selected function.

When it is determined that the input, which selects the read mode, is received at S280, a read command is transmitted to the door lock transmitter 1 to obtain setting data of the conversion table stored in the memory 13 of the door lock transmitter 1, and a display process is executed at S290 to display the data attached to a response, which is transmitted from the door lick transmitter 1 in response to the read command. Then, control returns to S230.

When it is determined that the input, which instructs the termination of the setting process, is received at S230, the present process is terminated.

Thus, through use of the rewrite system, the retrieval and the renewal of the contents of the conversion table stored in the memory 13 of the door lock transmitter 1 can be easily performed from the PC 5.

As described above, in the door lock transmitter 1 of the present embodiment, when the write command is inputted from the external device (PC 5) through the control interface 12, the contents of the conversion table stored in the memory 13 is renewed based on the link data attached to the write command. Furthermore, the conversion table and the transmission frame (serving as an operation command) are constructed to correspond with the various function IDs, the number (i.e., sixteen) of which is greater than the number (i.e., six) of the buttons.

Thus, in the door lock transmitter 1 of the present embodiment, the functions, which are assigned to the buttons SW1–SW6, can be freely selected from the various functions. Furthermore, the allocation pattern for allocating the selected functions to the buttons SW1–SW6 can be freely set.

Figure 6A:
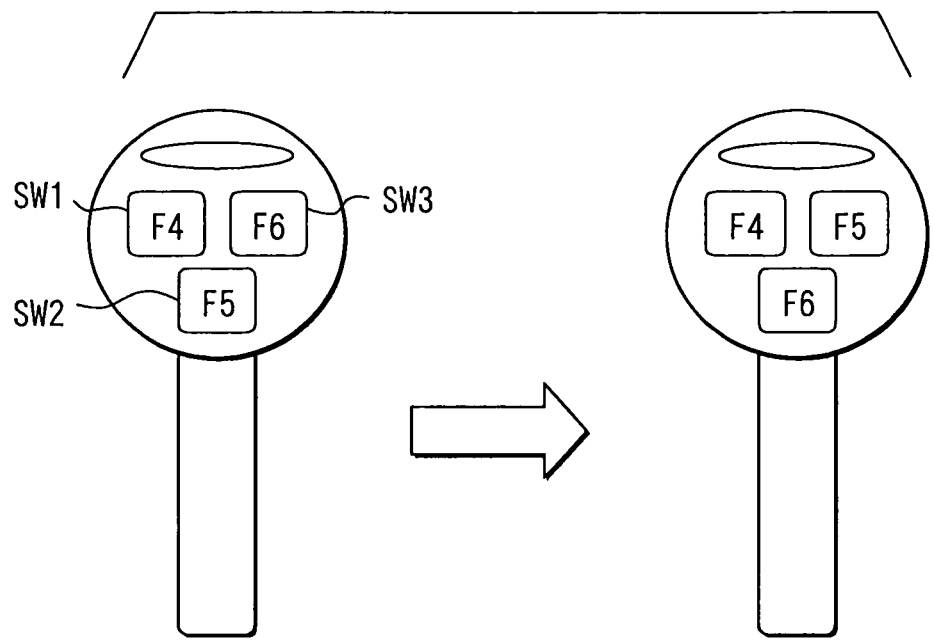
FIG. 6A is an explanatory diagram showing a change in an allocation of functions to switches of the door lock transmitter.
Figure 6B:
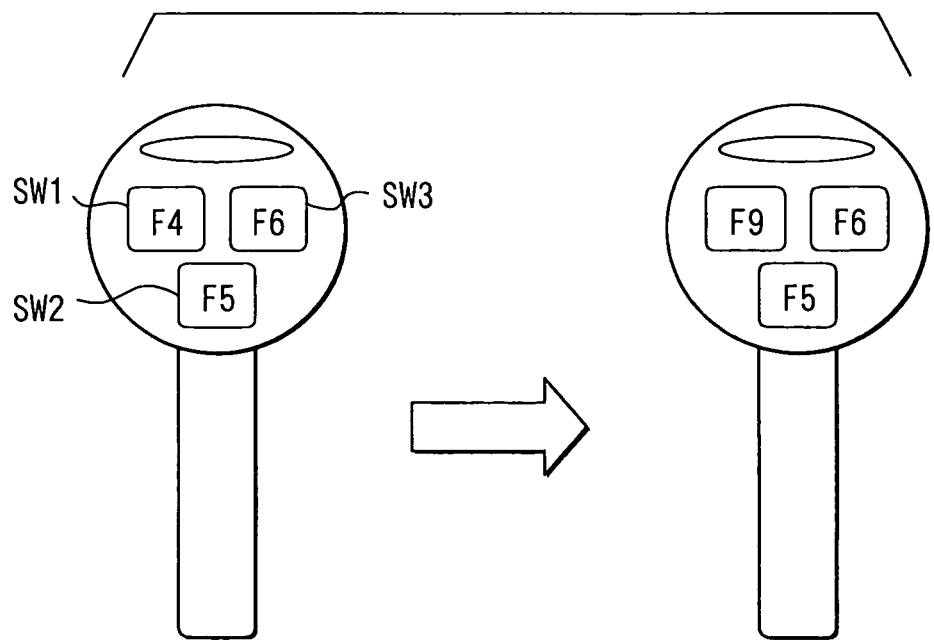
FIG. 6B is an explanatory diagram showing another change in the allocation of the functions to the switches of the door lock transmitter.

For example, as shown in FIG. 6A, the functions allocated to the two buttons SW2, SW3 can be reversed (e.g., changing FUN5 to FUN6, and changing FUN6 to FUN5). Alternatively, as shown in FIG. 6B, only the function allocated to the button SW1 can be changed to a different function (e.g., changing the FUN4 to FUN9).

The customization of the allocation pattern for allocating the functions to the buttons SW1–SW6 can be easily performed, and the various allocation patterns are provided. Thus, the convenience of the user can be improved.

In the present embodiment, the control interface 12 corresponds to an interface means, and the memory 13 corresponds to a storage means. Furthermore, S160 and S170 collectively correspond to a write control means, and S180 and S190 collectively correspond to a read control means. In addition, the transmission frame generation circuit 14 corresponds to an operation command generating means, and the transmitter circuit 15 corresponds to a transmitting means.

The one embodiment of the present invention has been described above. However, the present invention is not limited to the above embodiment and can be embodied in various ways.

For example, in the above embodiment, the EEPROM is used as the memory 13 for storing the conversion table. However, any other appropriate storage device can be used as long as the storage device allows data rewrite and retains its contents at the time of power failure while it is small enough to be received in the door lock transmitter 1. Furthermore, the memory 13 can be one that is rewritable only a limited number of times (e.g., only once).

Furthermore, in the above embodiment, both of the write (renewal) process and the read process of the contents of the conversion table are possible. However, it is possible to only allow the write process of the contents of the conversion table.

Furthermore, in the above embodiment, the wired interface, which uses the cable, is used as the control interface 12.

However, a wireless interface, which uses light or radio waves, can be used as the control interface 12.

Furthermore, in the above embodiment, the present invention is applied in the door lock transmitter. However, the present invention cab be embodied in an electronic key, a smart key or the like.

Additional advantages and modifications will readily occur to those skilled in the art. The invention in its broader terms is therefore not limited to the specific details, representative apparatus, and illustrative examples shown and described.

What is claimed is:

1. A portable transmitter for remotely operating a plurality of vehicular devices, each of which provides a corresponding one of a plurality of functions, the portable transmitter comprising:

a plurality of switches, each of which is linked with a corresponding one of the functions;

an operation command generating means for generating an operation command that causes a corresponding one of the vehicular devices to provide a selected one of the functions, which is selected upon operation of a corresponding one of the switches;

a transmitting means for performing wireless transmission of the operation command upon reception of the operation command from the operation command generating means;

a storage means for storing link data, which includes a plurality of links, wherein each link connects between a corresponding one the switches and a corresponding one of the functions;

an interface means for receiving an external command outputted from an external device; and a write control means for writing the link data in the storage means based on the external command received through the interface means, wherein the operation command generating means generates the operation command based on the link data stored in the storage means.

2. The portable transmitter according to claim 1, wherein:

the operation command is selected from a plurality of operation commands; and a number of the operation commands is greater than a number of the switches.

3. The portable transmitter according to claim 1, wherein contents of the storage means is rewritable.

4. The portable transmitter according to claim 1, further comprising a read control means for retrieving the contents of the storage means and then outputting the retrieved contents of the storage means through the interface means based on another external command received through the interface means.

5. The portable transmitter according to claim 1, wherein one of the plurality of functions is locking/unlocking of a vehicle door.

6. The portable transmitter according to claim 1, wherein the links, which are contained in the link data stored in the storage means, are variable.

* * * * *